(12) United States Patent
Kouvo et al.

(10) Patent No.: US 10,946,767 B2
(45) Date of Patent: Mar. 16, 2021

(54) CHARGING NOTIFICATION ARRANGEMENT IN UNDERGROUND MINING VEHICLE

(71) Applicant: SANDVIK MINING AND CONSTRUCTION OY, Tampere (FI)

(72) Inventors: Mikko Kouvo, Tampere (FI); Ville Vare, Tampere (FI); Mikko Kitula, Tampere (FI); Jorma Hongisto, Tampere (FI); Sami Huhtamaa, Tampere (FI); Severi Eerola, Tampere (FI); Sami Haikio, Tampere (FI); Matti Joutsela, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 186 days.

(21) Appl. No.: 16/309,915

(22) PCT Filed: Jun. 16, 2017

(86) PCT No.: PCT/EP2017/064751
§ 371 (c)(1),
(2) Date: Dec. 13, 2018

(87) PCT Pub. No.: WO2017/216331
PCT Pub. Date: Dec. 11, 2007

(65) Prior Publication Data
US 2019/0329670 A1    Oct. 31, 2019

(30) Foreign Application Priority Data
Jun. 17, 2016   (EP) ..................... 16174976

(51) Int. Cl.
*B60L 58/26* (2019.01)
*B60L 58/25* (2019.01)
(Continued)

(52) U.S. Cl.
CPC ............. *B60L 58/26* (2019.02); *B60L 3/0046* (2013.01); *B60L 58/25* (2019.02); *G06F 11/326* (2013.01);
(Continued)

(58) Field of Classification Search
CPC ......... B60L 58/26; B60L 3/0046; B60L 58/25
See application file for complete search history.

(56) References Cited

U.S. PATENT DOCUMENTS

2014/0021914 A1 *  1/2014  Martin ...................... B60L 3/04
                                                            320/109
2014/0266038 A1    9/2014  Gibeau et al.
(Continued)

*Primary Examiner* — John D Walters
*Assistant Examiner* — James J Triggs
(74) *Attorney, Agent, or Firm* — Corinne R. Gorski

(57) ABSTRACT

An underground mining vehicle includes an electric motor for driving the vehicle, a rechargeable battery for supplying electric energy to the electric motor and a charging system for recharging the rechargeable battery. A control unit is configured to control an operation of the charging system for controlling the recharging of the battery. The control unit is configured to have a number of selectable recharging modes (FRM, SLRM, SERM) and to control the recharging of the battery according to the selected recharging mode (FRM, SLRM, SERM). The vehicle also has a transmitter controlled by the control unit for sending a status notification about an automatic change from a recharging mode to another recharging mode to an operator remote terminal device of an operator of the vehicle.

13 Claims, 2 Drawing Sheets

(51) Int. Cl.
*B60L 3/00* (2019.01)
*G06F 11/32* (2006.01)

(52) U.S. Cl.
CPC ..... *B60L 2200/40* (2013.01); *B60L 2240/545* (2013.01)

(56) References Cited

U.S. PATENT DOCUMENTS

2015/0171486 A1 6/2015 Rawlinson
2016/0134001 A1* 5/2016 Lindholm ............... B60L 58/26
299/29

* cited by examiner

CHARGING NOTIFICATION ARRANGEMENT IN UNDERGROUND MINING VEHICLE

RELATED APPLICATION DATA

This application is a § 371 National Stage Application of PCT International Application No. PCT/EP2017/064751 filed Jun. 16, 2017 claiming priority to EP 16174976.1 filed Jun. 17, 2016.

FIELD OF THE INVENTION

The invention relates to an underground mining vehicle.

BACKGROUND OF THE INVENTION

Underground mining vehicles are typically provided with one or more combustion engines, these typically being diesel engines. A combustion engine requires a lot of space on a carriage of the vehicle, and necessitates regular maintenance. A combustion engine also has adverse effects on fire safety in a mine, since it has hot surfaces and it is also necessary to store and handle flammable fuel in the vehicle and the mine. Furthermore, in underground mines exhaust gases from the combustion engines must be ventilated out of the mine what increases the total energy consumption of underground mining considerably.

It is also possible to provide the underground mining vehicle with one or more electric motors such that at least the drive motor of the underground mining vehicle is an electric drive motor. Electric power to the electric drive motor may be supplied from a rechargeable battery provided in the vehicle.

BRIEF DESCRIPTION OF THE INVENTION

An object of the present invention is to provide a novel underground mining vehicle.

An underground mining vehicle comprises an electric motor for driving the vehicle, a rechargeable battery for supplying electric energy to the electric motor and a charging system comprising a charging circuit and a charging connection connected to the charging system for supplying electric energy to the charging system from an electric power source external to the vehicle for recharging the rechargeable battery. Further the underground mining vehicle comprises a control unit configured to control an operation of the charging system for controlling the recharging of the battery, the control unit being configured to comprise a number of selectable recharging modes and to control the recharging of the battery according to the selected recharging mode. Further the underground mining vehicle comprises a transmitter controlled by the control unit at least for sending a status notification about an automatic change from a recharging mode to another recharging mode to an operator remote terminal device of an operator of the underground mining vehicle.

In the solution the rechargeable battery of the underground mining vehicle may be recharged by using a number of different recharging modes, wherein each recharging mode may have at least partly different characteristics what comes to a recharging voltage, a recharging current, a recharging power and a duration of the recharging applied in the recharging of the battery. Furthermore, an automatic change from one recharging mode to another recharging mode is provided automatically in response to a detection of a failure taking place in the operations relating to the recharging, as well as a sending of a status notification signal to an operator remote terminal device for informing the operator of the underground mining vehicle about the automatic change of the recharging mode.

BRIEF DESCRIPTION OF THE DRAWINGS

In the following the invention will be described in greater detail by means of preferred embodiments with reference to the accompanying drawings, in which.

For the sake of clarity, the figures show some embodiments of the invention in a simplified manner. Like reference numerals identify like elements in the figures.

DETAILED DESCRIPTION OF THE INVENTION

Figure 1:
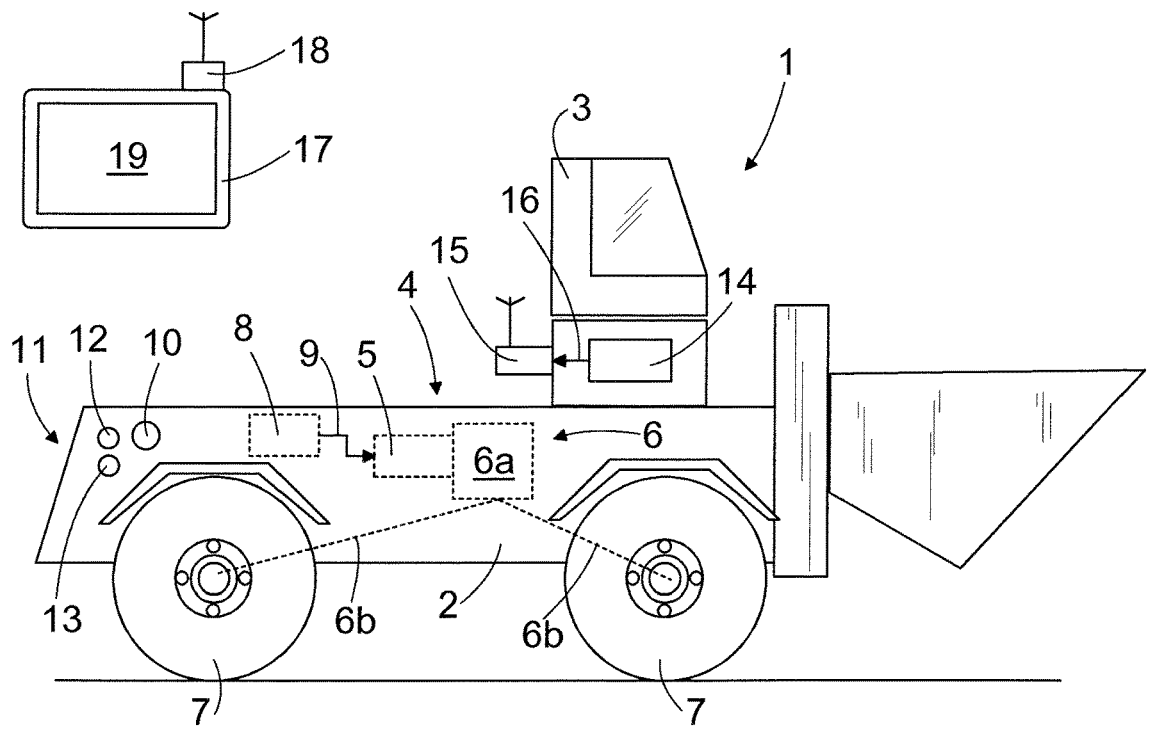
FIG. 1 is a schematic side view of an underground mining vehicle.

FIG. 1 shows schematically a side view of an underground mining vehicle 1, which may later in this description be called also a mining vehicle 1 or a vehicle 1. The vehicle 1 comprises a carriage 2 and a cabin 3 or a canopy 3 placed onto the carriage 2. The vehicle 1 may be moved by means of drive equipment 4. The drive equipment 4 comprises one or more electric motors 5 providing one or more drive motors of the underground mining vehicle 1, and power transmission means 6, such as a gearbox 6a and driving axles 6b, for transmitting drive power to one or more wheels 7. Alternatively one or more electric motors 5 may be connected directly to one or more wheels 7 so as to provide drive power to one or more wheels 7.

The underground mining vehicle 1 further comprises at least one rechargeable battery 8 for providing electric power to the electric motor 5 for moving the vehicle 1. This connection between the battery 8 and the motor 5 is shown schematically with an arrow 9. There may also be additional power electronics between the rechargeable battery 8 and the electric motor 5 for transforming the electric power supplied from the battery 8 to a form suitable for the electric motor 5. Further the vehicle 1 comprises one or more charging connections 10 for connecting the vehicle 1 to an external electric power source for recharging the rechargeable battery 8. Further the vehicle 1 comprises one or more cooling agent supply connections 11 for connecting the vehicle 1 to an external cooling agent source for cooling the rechargeable battery 8 during the recharging of the battery 8, if necessary. The cooling agent supply connection 11 comprises a cooling agent inlet connection 12 or an inlet connection 12 for an inlet flow of cooling agent from the external cooling agent source into a battery cooling system as well as a cooling agent outlet connection 13 or an outlet connection 13 for an outlet flow of cooling agent out from the battery cooling system back to the external cooling agent source.

The underground mining vehicle 1 further comprises one or more control units 14 to control at least some operations of the vehicle 1, such as a recharging of the at least one rechargeable battery 8 and a cooling of the at least one rechargeable battery 8, but possibly also other operations in the vehicle 1.

The underground mining vehicle 1 further comprises at least one transmitter 15 that is controlled by the control unit 14. The connection between the control unit 14 and the transmitter 15 is shown schematically with an arrow 16. The transmitter 15 is configured to send, as controlled by the control unit 14, at least a status notification of at least one operation relating to the recharging of the battery 8 of the underground mining vehicle 1 to an operator remote terminal device 17 that is operatively coupled to the control unit 14. The operator remote terminal device 17 comprises a receiver 18 for receiving the information transmitted by the transmitter 15 and at least one visual indication element 19, such as a display for displaying visually the information received. The operator remote terminal device 17 is intended to be carried with an operator of the underground mining vehicle 1 when the operator leaves the vehicle 1. The operator remote terminal device 17 may also be connected to be a part of the vehicle 1 either ins side or outside of the cabin 3 for example with a wired connection when the operator is in the vehicle 1 or close to it.

The underground mining vehicle 1 may be a dumper, a loader, a rock drilling rig or any other mining vehicle. The underground mining vehicle 1 may be equipped with one or more mining work devices which mining work device may be one or more of the following mining work devices: rock drilling machine, bolting machine, shotcreting device, scaling device, injection device, blasthole charger, loading device, bucket, box, measuring device, or drilling, sealing and propellant feeding equipment used in small-charge excavation.

Figure 2:
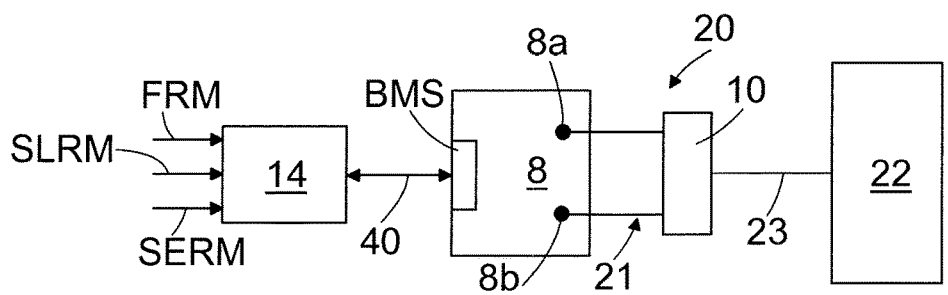
FIG. 2 is a schematic view of a charging system for a rechargeable battery in an underground mining vehicle.

FIG. 2 is a schematic view of a charging system 20 for the rechargeable battery 8, i.e. a battery charging system 20, in the underground mining vehicle 1 for recharging the battery 8. The charging system 20 comprises at least one charging circuit 21 connected to a positive terminal 8*a* of the battery 8 and a negative terminal 8*b* of the battery 8. The charging system 20 further comprises the charging connection 10. The charging system 20 may be connected to an electric power source 22 external to the vehicle 1 through a charging cable 23 to be connected from the electric power source 22 to the charging connection 10 in the vehicle 1. The electric power source 22 may for example be a specific charging station connected to an electric power system of the underground mine and intended only for recharging of the rechargeable batteries 8 remaining in the vehicle 1. Alternatively the electric power source 22 may be a large current output in the electric power system of the underground mine, for example.

The rechargeable battery 8 comprises a battery management system BMS that manages an operation of the battery, such as protecting the battery from operating outside of its safe operating area, monitoring its state, calculating secondary data and reporting that data. The control unit 14 is connected to the battery management system BMS for receiving the data from the battery management system BMS. The connection between the battery 8 and the control unit 14 is shown schematically with an arrow 40. The control unit 14 is configured to control the recharging of the battery 8 according to selectable recharging modes, such as a fast recharging mode FRM, a slow recharging mode SLRM and a service recharging mode SERM, which are presented in more detail later.

Figure 3:
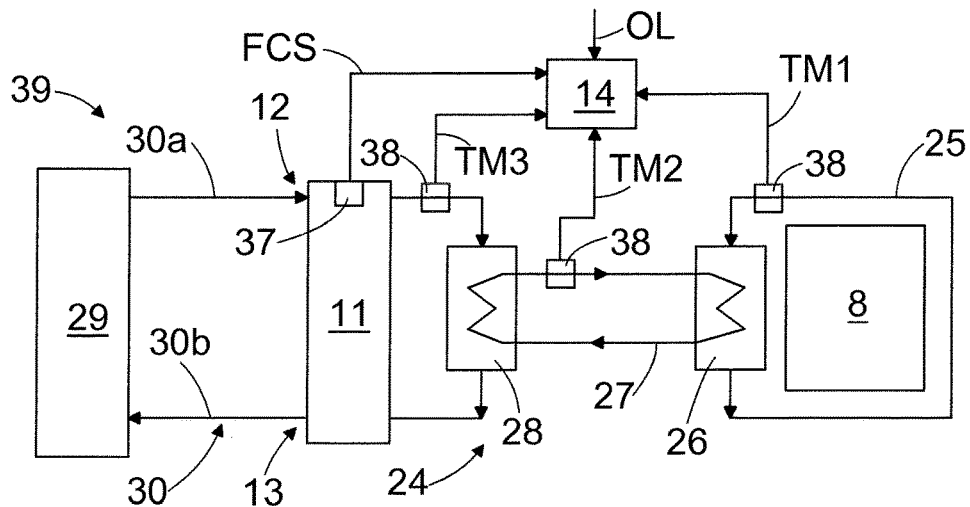
FIG. 3 is a schematic view of a cooling system for a rechargeable battery in an underground mining vehicle.

FIG. 3 is a schematic view of a cooling system 24 for the rechargeable battery 8, i.e. a battery cooling system 24, in the underground mining vehicle 1 for recharging the battery 8. The cooling system 24 comprises a first cooling circuit 25, wherein cooling agent, i.e. cooling medium, is arranged to flow and to receive excessive heat from the battery 8, especially during the recharging of the battery 8. Cooling agent is circulated in the first cooling circuit 25 by using a pump that is not shown in FIG. 3 for the sake of clarity.

The cooling system 24 comprises also a second cooling circuit 27 with cooling agent being arranged to flow in the second cooling circuit 27 and receive excessive heat from cooling agent flowing in the first cooling circuit 25 by a first heat exchanger 26 remaining between the first cooling circuit 25 and the second cooling circuit 27. Cooling agent is circulated in the second cooling circuit 27 by using a pump that is also not shown in FIG. 3 for the sake of clarity.

The cooling system 24 further comprises a second heat exchanger 28 in the second cooling circuit 27 and the cooling agent supply connection 11 comprising the cooling agent inlet connection 12 and the cooling agent outlet connection 13. The cooling system 24 may be connected to a cooling agent source 29 external to the vehicle 1 through a cooling agent supply line 30 to be connected to the cooling agent supply connection 11 in the vehicle 1. The cooling agent supply line 30 comprises a cooling agent inlet flow line 30*a* to be connected to the cooling agent inlet connection 12 in the cooling agent supply connection 11, through which cooling agent supplied by the external cooling agent source 29 is supplied to the second heat exchanger 28. In the second heat exchanger 28 cooling agent flow from the external cooling agent source 29 receives excessive heat from cooling agent flowing in the second cooling circuit 27. The cooling agent supply line 30 comprises also a cooling agent outlet flow line 30*b* to be connected to the cooling agent outlet connection 13 in the cooling agent supply connection 11, through which cooling agent supplied originally from the external cooling agent source 29 to the second heat exchanger 28 and heated therein is returned back to the external cooling agent source 29. The external cooling agent source 29 comprises a pump, which again is not shown in FIG. 3 for the sake of clarity, for providing the cooling agent flow in the cooling agent supply line 30, in the cooling agent supply connection 11 and in the lines connecting the cooling agent supply connection 11 to the second heat exchanger 28.

In the embodiment disclosed in FIG. 3 the first cooling circuit 25 and the first heat exchanger 26 therein, as well as the second cooling circuit 27 and the second heat exchanger 28 therein thus belong to the cooling system 24 being part of the underground mining vehicle 1. The second cooling circuit 27 is arranged to provide an intermediate cooling circuit between the first cooling circuit 25 and a cooling circuit provided by the external cooling agent source 29, the cooling agent supply line 30, the cooling agent supply connection 11 and possible lines connecting the cooling agent supply connection 11 to the second heat exchanger 28, which is considered to provide the third cooling circuit 39 when the vehicle 1 is connected to the external cooling agent source 29. In some embodiments the cooling agent supply line 30 could be connected straight to the first heat exchanger 26 through the cooling agent supply connection 11, if the second cooling circuit 27 and the second heat exchanger 28 therein has been left away from the mining vehicle 1.

The external cooling agent source 29 may for example be a water storage for mining operations or a water distribution system of the underground mine.

Figure 4:
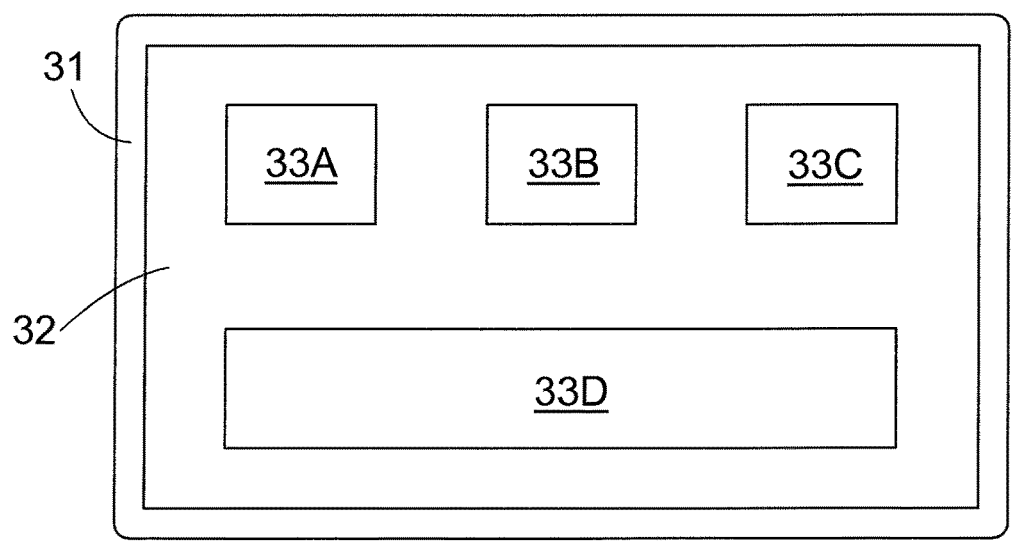
FIG. 4 is a schematic view of a first operator remote terminal device.

FIG. 4 shows schematically a mobile smart device 31 providing a first possible operator remote terminal device 17. The mobile smart device 31 comprises a display 32 providing a kind of a visual indication element and an internal receiver for receiving the information transmitted by the transmitter 15 as controlled by the control unit 14, as well as an internal rechargeable battery for providing the operating power of the mobile smart device 31. The receiver and the battery are not shown in FIG. 4 for the sake of clarity. A graphical user interface to be shown on the display 32 may comprise a number of information elements, in FIG. 4 information elements 33A, 33B, 33C, 33D, for indicating information, such as a status notification, relating to a recharging of the battery 8. Each information element 33A, 33B, 33C, 33D is formed of an area in the graphical user interface presented on the display 32 of the mobile smart device 31.

The information element 33A may for example indicate a fast recharging mode of the rechargeable battery 8 being in use or active. The information element 33B may for example indicate a slow recharging mode of the rechargeable battery 8 being in use or active. The information element 33C may for example indicate a service recharging mode being in use or active. The information elements 33A, 33B, 33C may for example indicate with a blinking way or a continuously shown colour the specific selected recharging mode being in use or active and with another blinking way or continuously shown colour the specific selected recharging mode being completed or a failure operation relating to the specific recharging mode being detected. Only one of the information elements 33A, 33B, 33C is needed if different recharging modes and their status notification are informed by different blinking ways or continuously shown colours. The information element 33D may indicate an additional information in text form about a reason of the failure having taken place in the recharging of the battery 8.

The different recharging modes, such as the fast recharging mode, the slow recharging mode and the service recharging mode are presented in more detail later.

Figure 5:
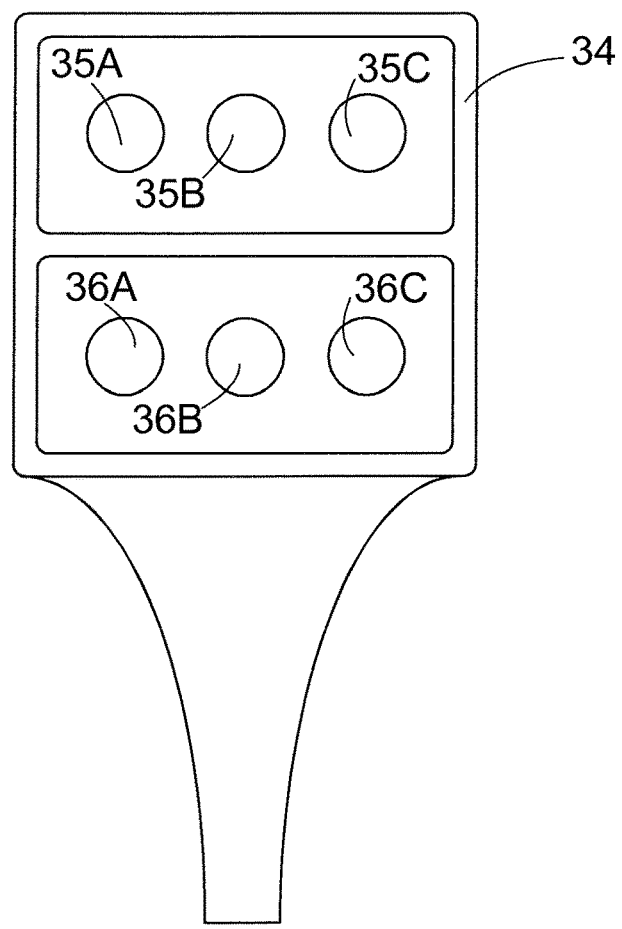
FIG. 5 is a schematic view of a second operator remote terminal device.

FIG. 5 shows schematically a portable status indicator light module 34 providing a second possible operator remote terminal device 17. The portable light indicator status module 34 comprises a higher row of indicator lamps, i.e. indicator lamps 35A, 35B, 35C and a lower row of indicator lamps, i.e. indicator lamps 36A, 36B, 36C, the indicator lamps providing kinds of information elements indicating status notification relating to the recharging of the battery 8. The portable light module 34 further comprises an internal receiver for receiving the information transmitted by the transmitter 15 as controlled by the control unit 14, as well as an internal rechargeable battery for providing the operating power of the portable light module 34. The receiver and the battery are not shown in FIG. 5 for the sake of clarity.

The information element 35A may for example indicate a fast recharging mode of the rechargeable battery 8 being in use or active. The information element 35B may for example indicate a slow recharging mode of the rechargeable battery 8 being in use or active. The information element 35C may for example indicate a service recharging mode being in use or active. The information elements 35A, 35B, 35C may for example indicate with a blinking light the corresponding recharging mode being in use or active and with a continuous light the corresponding recharging mode operation being completed.

The information element 36A may for example indicate, with a blinking or continuous light, that there has occurred a failure in the fast recharging mode of the rechargeable battery 8. The information element 36B may for example indicate, with a blinking or continuous light, that there has occurred a failure in the slow recharging mode of the rechargeable battery 8. The information element 36C may for example indicate, with a blinking or continuous light, that there has occurred a failure in the service recharging mode.

Light bulbs of different colours may be applied in the background of the indicator lamps 35A, 35B, 35C, 36A, 36B, 36C, whereby different states of the recharging may also be informed by activating and deactivating light bulbs of different colours in the indicator lamps, whereby the number of the indicator lamps may be reduced so that in its minimum there may be only indicator lamp, i.e. only one information element, in the portable light module 34.

The control unit 14 is configured to comprise a number of selectable recharging modes and to control the recharging of the battery 8 according to the selected recharging mode. The recharging mode is selected by the operator of the underground mining vehicle 1 at the beginning of the recharging. The number of selectable recharging modes comprise at least the recharging modes mentioned above, i.e. the fast recharging mode, the slow recharging mode and the service recharging mode. Each recharging mode has its own special characteristics or recharging parameters that affect on at least one of a recharging voltage, a recharging current, a recharging power and a duration of the recharging, and the control unit 14 is configured to control the recharging of the rechargeable battery according to the recharging parameters of the selected recharging mode.

According to an embodiment in the fast recharging mode FRM the charging time may be for example from 15 to 20 minutes. In the fast recharging mode FRM the recharging current may for example be 400 A or the recharging power may for example be 300 kW.

According to an embodiment, when the fast recharging mode FRM is active, yellow light or colour is lit continuously in the corresponding information element in the operator remote terminal device 17, 31, 34.

According to an embodiment, when the fast recharging mode FRM is completed, green light or colour is lit continuously in the corresponding information element in the operator remote terminal device 17, 31, 34.

According to an embodiment, when the fast recharging mode FRM is interrupted, for example due to a failure taking place during the recharging, red light or colour is lit continuously in the corresponding information element in the operator remote terminal device 17, 31, 34.

According to an embodiment in the slow recharging mode SLRM the charging time may be for example from one hour to two hours. In the slow recharging mode SLRM the recharging current may for example be 100 A or the recharging power may for example be 75 kW.

According to an embodiment, when the slow recharging mode SLRM is active, yellow light or colour is blinking in the corresponding information element in the operator remote terminal device 17, 31, 34.

According to an embodiment, when the slow recharging mode SLRM is completed, green light or colour is lit continuously in the corresponding information element in the operator remote terminal device 17, 31, 34.

According to an embodiment, when the slow recharging mode SLRM is interrupted, for example due to a failure taking place during the recharging, red light or colour is lit continuously in the corresponding information element in the operator remote terminal device 17, 31, 34.

According to an embodiment in the service recharging mode SERM the charging time may be for example several hours, for example more than two hours. In the service recharging mode SERM the recharging current may for example be % A or the recharging power may for example be 3 kW.

According to an embodiment, when the service recharging mode SERM is active, yellow light or colour is blinking in the corresponding information element in the operator remote terminal device 17, 31, 34.

According to an embodiment, when the service recharging mode SERM is completed, green light or colour is lit continuously in the corresponding information element in the operator remote terminal device 17, 31, 34.

According to an embodiment, when the service recharging mode SERM is interrupted, for example due to a failure taking place during the recharging, red light or colour is lit continuously in the corresponding information element in the operator remote terminal device 17, 31, 34.

When the rechargeable battery 8 is recharged with the fast recharging mode FRM, cooling agent supply from the external cooling agent source 29 to the cooling system 24 of the rechargeable battery 8 is necessary. In order to detect the cooling agent supply from the external cooling agent source 29 being connected to the cooling agent supply connection 11, there may be one or more detection elements 37 arranged in connection to the cooling agent supply connection 11 for detecting the cooling agent supply from the external cooling agent source 29 being connected to the cooling agent supply connection 11 in the vehicle 1, as shown schematically in FIG. 3.

According to an embodiment, the detection element 37 is a mechanical switch which is arranged to activate in response to the cooling agent supply line 30 being connected to the cooling agent supply connection 11 in the vehicle 1.

According to another embodiment, the detection element 37 is a pressure sensor which is arranged to activate in response to the cooling agent flowing through the cooling agent inlet connection 12 in the cooling agent supply connection 11 in the vehicle 1.

In response to the detection element 37 not being active, i.e. in response to the detection element 37 not being active at all from the beginning of the recharging of the battery, or in response to a change of a state of the detection element 37 from an active state to a non-active state during the recharging of the battery, the detection element 37 thus indicating a lack of the cooling agent supply from the external cooling agent source 29 to the battery cooling system 24, the control unit 14 is configured to receive from the detection element 37 a corresponding detection signal FCS, that informs about a failure or blockage in the cooling agent supply from the external cooling agent source 29 to the battery cooling system 24. In response to that the control unit 14 is configured to change the fast recharging mode FRM to the slow recharging mode SLRM, and send a status notification about the change of the fast recharging mode FRM to the slow recharging mode SLRM, as well as the corresponding information about the reason for the change of the recharging mode, to the operator remote terminal device 17, 31, 34 through the transmitter 15 in the vehicle 1. In response to receiving the status notification about the change of the fast recharging mode FRM to the slow recharging mode SLRM the content of the corresponding information elements in the operator remote terminal device 17, 31, 34 are changed accordingly.

Similar detection elements 37 may also be arranged in the first 25 and the second 27 cooling circuits.

According to an embodiment at least one cooling circuit, i.e. the first cooling circuit 25, the second cooling circuit 27, or the cooling circuit 39 provided by the external cooling agent source 29, the cooling agent supply line 30, the cooling agent supply connection 11 and possible lines connecting the cooling agent supply connection 11 to the second heat exchanger 28, may comprise a temperature sensor 38 to measure the temperature TM1, TM2, TM3 of the cooling agent flowing in the corresponding cooling circuit, as also shown schematically in FIG. 3. Temperature TM1 or the temperature measurement signal TM1 refers to the cooling agent temperature in the cooling circuit 25, temperature TM2 of the temperature measurement signal TM2 refers to the cooling agent temperature in the cooling circuit 27 and temperature TM3 or the temperature measurement signal TM3 refers to the cooling agent temperature in the cooling circuit 39. The temperature measurement signal TM1, TM2, TM3 is transmitted to the control unit 14. The control unit 14 compares the temperature measurement signal TM1, TM2, TM3 to a corresponding predetermined overheating limit OL for determining whether the measured cooling agent temperature TM1, TM2, TM3 exceeds the predetermined overheating limit OL. The predetermined overheating limit OL may be set for example on the basis of the recharging temperature characteristics of the rechargeable battery 8.

In response to the temperature of cooling agent flowing in the at least one cooling circuit exceeding the overheating limit OL, the control unit 14 is arranged to limit the recharging power at least in that case if the fast recharging mode FRM or the slow recharging mode SLRM was originally selected for the recharging of the battery 8. At the same time the control unit 14 is configured to send a corresponding status notification to the operator remote terminal device 17, 31, 34 for changing the content of the corresponding information elements in the operator remote terminal device 17, 31, 34 accordingly.

According to an embodiment, if the battery management system BMS sends any alert signal to the control unit 14, the control unit 14 will, in response to receiving the alert signal from the battery management system BMS, limit the charging power or current to zero. The control unit 14 is also configured to send a corresponding status notification for changing the content of the corresponding information elements in the operator remote terminal device 17, 31, 34 accordingly.

According to an embodiment the external electric power source 22 may be the same equipment or a current output for the fast recharging mode FRM and the slow recharging mode SLRM, but a different equipment or a current output for the service recharging mode SERM, which may also have an effect for the type of the charging cable 23 used in the recharging. In the service recharging mode SERM it may be used a charging cable that can be connected to normal 110 VAC-230 VAC one phase socket, whereas in the fast recharging mode FRM and the slow recharging mode SLRM a heavy duty 3-phase charging cable 23 is used. The control unit 14 may receive from the charging equipment a signal indicating the charging cable 23 selected. In response to the selection of the charging cable 23 applied for the service recharging mode SERM the control unit 14 may automatically start the cooling of the rechargeable battery 8 by applying the external cooling agent source 29. The control unit 14 is also configured to send a corresponding status notification for changing the content of the corresponding information elements in the operator remote terminal device 17, 31, 34 accordingly.

The advantage of the solution is for example that the rechargeable battery may be recharged by using a number of different recharging modes, wherein each recharging mode may have at least partly different characteristics what comes to the recharging voltage, the recharging current, the recharging power and the duration of the recharging applied in the recharging. Furthermore, the solution provides an automatic change from one recharging mode to another recharging mode automatically in response to a detection of a failure taking place in the operations relating to the recharging. Furthermore a status notification signal is sent automatically to an operator remote terminal device for informing the operator of the underground mining vehicle about the automatic change of the recharging mode.

It will be obvious to a person skilled in the art that, as the technology advances, the inventive concept can be implemented in various ways. The invention and its embodiments are not limited to the examples described above but may vary within the scope of the claims.

The invention claimed is:

1. An underground mining vehicle comprising:
   an electric motor for driving the vehicle;
   a rechargeable battery for supplying electric energy to the electric motor;
   a charging system including a charging circuit and a charging connection connected to the charging system for supplying electric energy to the charging system from an electric power source external to the vehicle for recharging the rechargeable battery;
   a battery cooling system including at least one cooling circuit having a cooling agent for cooling the battery;
   a measuring element for measuring cooling agent temperature in the at least one cooling circuit;
   a control unit configured to control an operation of the charging system for controlling the recharging of the battery, the control unit being configured to have a number of different, selectable recharging modes, wherein each selectable recharging mode has unique recharging parameters that affect at least one of a recharging voltage, a recharging current, a recharging power and a duration of the recharging, and to control the recharging of the battery according to the selected recharging mode, wherein the control unit is configured to perform an automatic change from one selectable recharging mode to another selectable recharging mode in response to the cooling agent temperature in the at least one cooling circuit exceeding an overheating limit; and
   a transmitter controlled by the control unit at least for sending a status notification about an automatic change from one selectable recharging mode to another selectable recharging mode to an operator remote terminal device of an operator of the underground mining vehicle.

2. The underground mining vehicle as claimed in claim 1, wherein the battery cooling system includes a first cooling circuit with cooling agent for receiving excessive heat from the battery and a second cooling circuit with cooling agent for receiving excessive heat from the cooling agent in the first cooling circuit, the measuring element for measuring cooling agent temperature being arranged in at least one of the first and second cooling circuit.

3. The underground mining vehicle as claimed in claim 1, further comprising a cooling agent supply connection connected to the battery cooling system for connecting the battery cooling system to a cooling agent source external to the vehicle, wherein the measuring element for measuring cooling agent temperature is arranged in the cooling agent supply connection for measuring cooling agent temperature of the cooling agent flowing between the battery cooling system and the cooling agent source external to the vehicle.

4. The underground mining vehicle as claimed in claim 1, wherein the recharging mode includes recharging parameters affecting on at least one of a recharging voltage, a recharging current, a recharging power and a duration of the recharging, and that the control unit is configured to control the recharging of the battery according to the recharging parameters of the selected recharging mode.

5. The underground mining vehicle as claimed in claim 1, wherein the control unit is configured to include at least a fast recharging mode, a slow recharging mode and a service recharging mode.

6. The underground mining vehicle as claimed in claim 2, wherein the at least one cooling circuit of the battery cooling system has at least one detector element for detecting a cooling agent flow in the at least one cooling circuit of the battery cooling system.

7. The underground mining vehicle as claimed in claim 6, wherein the control unit is configured to change the operation of the recharging from the fast recharging mode to the slow recharging mode in response to the detector element indicating a failure in the flow of the cooling agent in the at least one cooling circuit of the cooling system.

8. The underground mining vehicle as claimed in claim 1, wherein the operator remote terminal device is a status indicator light mountable on a canopy of the underground mining vehicle.

9. The underground mining vehicle as claimed in claim 1, wherein the operator remote terminal device is a mobile smart device.

10. An arrangement comprising an underground mining vehicle as claimed in claim 1; and
    an operator remote terminal device of an operator of the underground mining vehicle, wherein the operator remote terminal device of the operator of the underground mining vehicle is configurable to be connected to the control unit of the underground mining vehicle and includes a receiver for receiving at least a status notification about the recharging operation of the battery and an information element for indicating the status notification of the recharging of the battery, the information element being configured to indicate at least the recharging mode selected for the recharging of the battery.

11. The arrangement as claimed in claim 10, wherein the operator remote terminal device includes at least two information elements for indicating at least two pieces of status notification of the recharging of the battery, one of the information elements being configured to indicate a failure happening during the recharging and the other of the information elements being configured to indicate a reason for the failure.

12. A method for a battery operated underground mining vehicle comprising:
    charging a rechargeable battery using a charging system having a charging circuit and a charging connection connected to the charging system to which charging connection electric energy is supplied from an electric power source external to the vehicle for recharging the battery;
    cooling the rechargeable battery using a cooling system including at least one cooling circuit with a cooling agent;
    measuring a cooling agent temperature in the at least one cooling circuit;

comparing the measured cooling agent temperature to an overheating limit set for the cooling agent temperature;

controlling by a control unit an operation of the charging system for controlling the recharging of the battery according to a selected recharging mode of a number of different, selectable recharged modes configured into the control unit, wherein each selectable recharging mode has unique recharging parameters that affect at least one of a recharging voltage, a recharging current, a recharging power and a duration of the recharging;

performing an automatic change from one selectable recharging mode to another selectable recharging mode in response to the cooling agent temperature exceeding the overheating limit; and sending, as controlled by a control unit, a status notification to an operator remote terminal device of an operator of the underground mining vehicle in response to an automatic change from one selectable recharging mode to another selectable recharging mode.

13. The method as claimed in claim 12, further comprising supplying the cooling agent to the at least one cooling circuit of the cooling system from a cooling agent source external to the vehicle for cooling the battery, monitoring the cooling agent flow in the at least one cooling circuit of the cooling system, and performing an automatic change from a recharging mode to another recharging mode in response to an indication of a failure in the flow of the cooling agent in the at least one cooling circuit of the cooling system.

* * * * *